United States Patent [19]

Bouchard et al.

[11] 4,130,083
[45] Dec. 19, 1978

[54] ACTIVATING MECHANISM FOR FLASHLAMP ARTICLE

[75] Inventors: Andre C. Bouchard, Peabody; Harold H. Hall, Jr., Marblehead, both of Mass.

[73] Assignee: GTE Sylvania Incorporated, Danvers, Mass.

[21] Appl. No.: 803,564

[22] Filed: Jun. 6, 1977

[51] Int. Cl.² .......................... G08B 7/08; G08B 17/02; G08B 13/08
[52] U.S. Cl. .................................... 116/114.5; 116/5; 116/7; 116/87; 116/105; 116/106; 431/361
[58] Field of Search ............... 116/5, 2, 4, 15, 105, 116/106, 104, 101, 7, 85, 86, 87, 88, 89, 114.5; 340/276, 228, 213, 274; 362/11, 13, 14, 15; 102/86.5, 70 R; 431/95 R, 95 A, 93, 92

[56] References Cited
U.S. PATENT DOCUMENTS

| 2,270,226 | 1/1942 | Pease | 116/105 |
| 3,597,604 | 8/1971 | Shaffer | 240/1.3 |
| 3,714,647 | 1/1973 | Litman | 340/416 |

Primary Examiner—S. Clement Swisher
Assistant Examiner—Denis E. Corr
Attorney, Agent, or Firm—Lawrence R. Fraley

[57] ABSTRACT

Activation means for activating at least one percussive flashlamp unit located within a flashlamp article. An activator moves within a casing when released by a pivotal retaining arm to engage and effect release of the flashlamp unit's striker spring. The retaining arm provides release of the activator in response to external actuation, e.g., the opening of a door or window.

25 Claims, 8 Drawing Figures

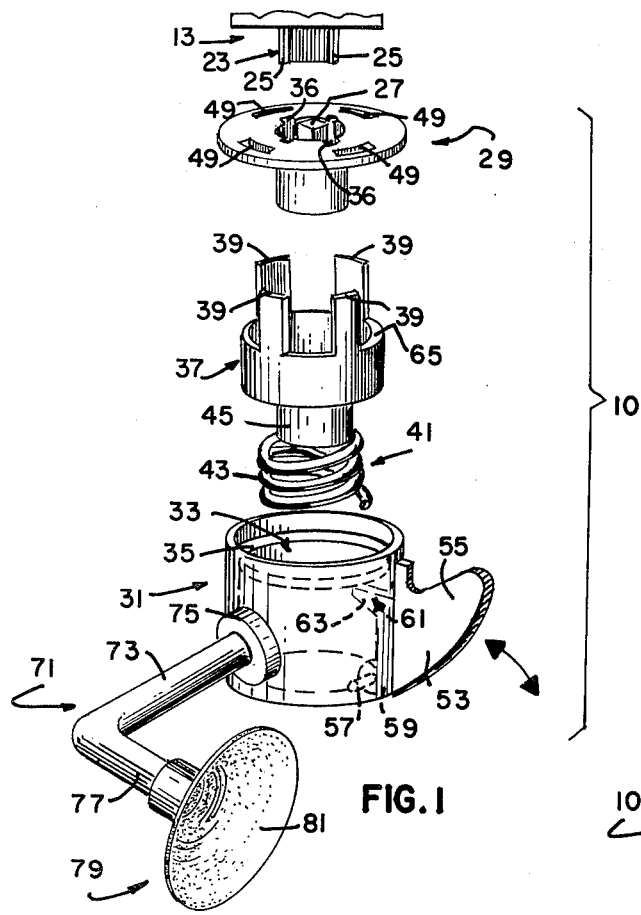
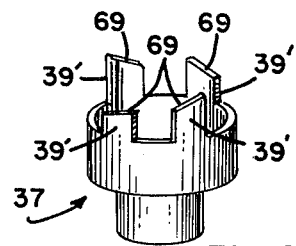
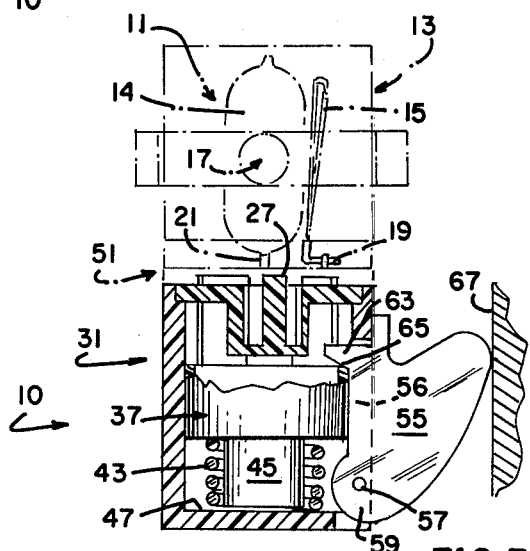
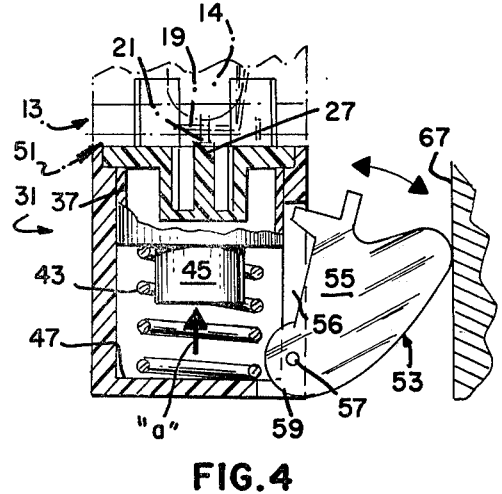
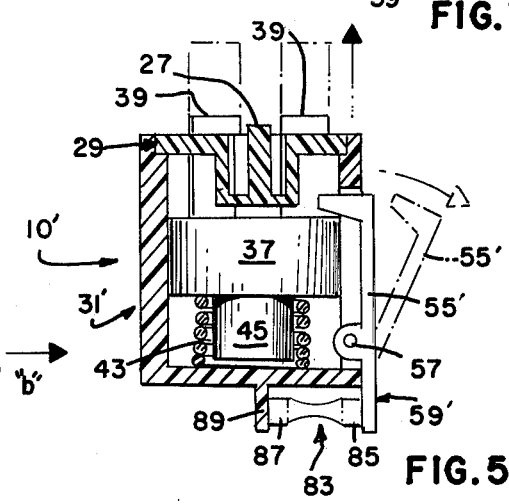

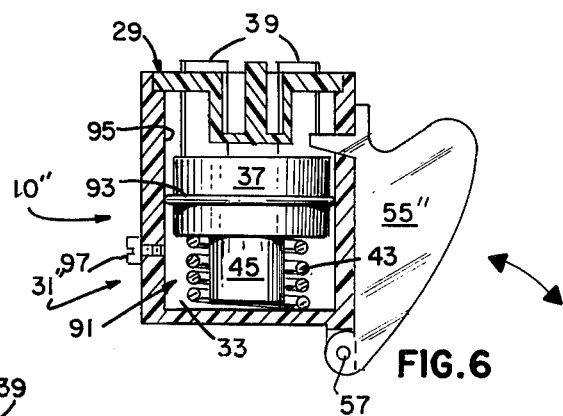
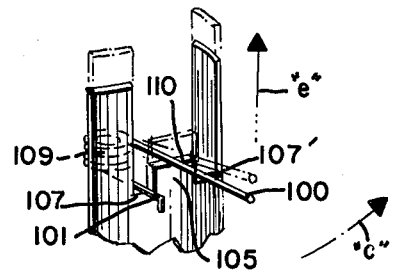
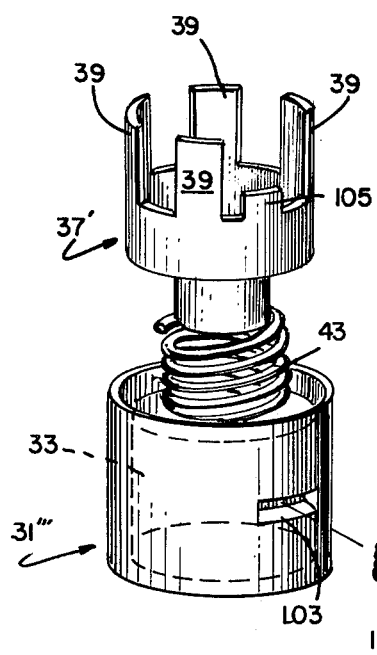
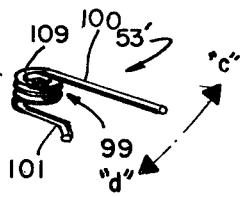

ACTIVATING MECHANISM FOR FLASHLAMP ARTICLE

CROSS REFERENCE TO COPENDING APPLICATIONS

An application listed under Ser. No. 803,565 and entitled "Flashlamp Assembly For Providing Highly Intense Audible And Visual Signals" (A. C. Bouchard et. al.) was filed June 6, 1977. Ser. No. 803,565 is assigned to the same assignee as the present invention and defines a flashlamp assembly which utilizes at least one combustible member in operative relationship to each of the flashlamps. The combustible member provides a highly intense audible signal in response to receipt of the intense energy from the respective fired flashlamps.

Another application, listed under Ser. No. 803,563, entitled "Activation Means for Flashlamp Article" (R. G. Blaisdell et. al.), was also filed June 6, 1977 and assigned to the assignee of the present invention. The activation means defined in Ser. No. 803,563 includes a biasing member, e.g. helical spring, for biasing a movable activator away from the respective flashlamp article.

BACKGROUND OF THE INVENTION

The invention relates to activating mechanisms and particularly to activating mechanisms which function in response to some form of external actuation, e.g., the opening or closing of a window or door. As can be appreciated, such mechanisms are particularly applicable to alarm systems.

In the aforementioned copending applications, there is described a flashlamp article which is capable of emitting both highly intense audible and visual signals. The article is particularly adapted for use in alarm type situations. As will be defined, the activating mechanism of the present invention is especially suited for triggering the above and similar flashlamp articles. It will also be understood from the following description that the mechanism of the present invention provides several advantages features over the activating mechanism described in copending application Ser. No. 803,565. Among these include a heat sensing means and means for providing a temporary delay between actuation of the mechanism and emission of the desired alarm signals. The heat sensing embodiment assures a means whereby a fire may be readily detected.

It is believed therefore that an activating mechanism which provides the above mentioned advantageous features would constitute an advancement in the art.

OBJECTS AND SUMMARY OF THE INVENTION

It is an object of the invention to provide an activating means which is particularly adapted for activating such devices as flashlamp signal articles.

According to one aspect of the invention, there is provided an activation means which comprises a casing, an activator movably oriented within the casing and adapted for occupying first and second positions therein, means within the casing for moving the activator from the first position to the second, and a retaining means for retaining the activator in the first position. Release of the retainer permits the activator to move to the second position whereby the activator will effect firing of the flashlamp unit.

BRIEF DESCRIPTION OF THE DRAWINGS

FIG. 1 is an exploded isometric of an activating means in accordance with a preferred embodiment of the invention;

FIG. 2 is a isometric view of an alternative embodiment of an activator member for use with the means of FIG. 1;

FIGS. 3 and 4 represent the respective movements of some of the components within the invention during actuation thereof;

FIGS. 5-7 illustrate various alternate embodiments of the invention; and

FIG. 8 is an enlarged view of a portion of the embodiment of FIG. 7.

DETAILED DESCRIPTION OF THE PREFERRED EMBODIMENTS

For a better understanding of the present invention together with other and further objects, advantages and capabilities thereof, reference is made to the following disclosure and appended claims in connection with the above-described drawings.

With particular reference to FIG. 1, there is shown an activation means 10 in accordance with a preferred embodiment of the invention. Means 10 is particularly suited for activating at least one flashlamp unit 11 (FIG. 3) located within a flashlamp article 13 and including a percussively-ignitable flashlamp 14 and a prestressed striker spring 15 associated therewith. As will be described, activation of article 13 occurs only when the article is positioned on means 10. A more complete description of flashlamp article 13 is provided in the aforementioned copending application under Ser. No. 803,565.

As mentioned in Ser. No. 803,565 the preferred flashlamp for use in article 13 is similar to that defined in U.S. Pat. No. 3,535,063 (L. F. Anderson et. al.), said patent assigned to the assignee of the present invention. The striker spring normally associated with lamps of this variety and used to fire the lamp when activated is described in U.S. Pat. No. 3,597,604 (J. W. Shaffer), said patent also assigned to the assignee of the invention. The flashlamp article described in U.S. Pat. No. 3,597,604 represents one particular example of an article 13 capable of being activated by the present invention. As further defined in Ser. No. 3,803,565 article 13 also includes at least one combustible member 17 located in operative relationshhip to flashlamp 14 and adapted for emitting a high intensity audible signal in response to receipt of energy in the form of light and/or heat from the activated flashlamp. Similar to the flashlamp article described in U.S. Pat. No. 3,597,604, article 13 preferably includes four flashlamps with a single striker spring associated with each lamp. The function of the present invention is to therefore positively engage the striker arm (19 in FIGS. 3 and 4) and release this member from its retention, causing it to thereafter strike and deform the primer 21 typically associated with percussive flashlamp 14 located adjacent thereto. Deformation of primer 21 results in "firing" or "flashing" of the respective lamp.

Only the stud portion 23 of the above-cited article 13 is shown in FIG. 1. Portion 23 preferably includes four protruding ribbed legs 25 which facilitate alignment of article 13 on activation means 10. As will be described, stud portion 23 also preferably includes an opening (not shown) therein which will accommodate an upstanding alignment member 27 of the seating means 29 of the invention.

Activation means 10 further comprises a casing 31 which defines a chamber 33 therein. Seating means 29 is located at one end of casing 31 and rests upon a ledge 35 within the casing. Means 29 includes four longitudinal slots 36 therein for receiving legs 25 of stud portion 23. Movably positioned within chamber 33 is an activator 37 having thereon at least one upstanding engagement member 39 which engages and relaxes the striker arm 19 of spring 15 when article 13 is positioned on seating means 29 and means 10 is actuated. The above activation of article 13 occurs when activator 37 occupies a second position (FIG. 4), having moved thereto from its original retained position shown in FIG. 3. This movement is accomplished by means 41 located within chamber 33. Means 41 is preferably a helical spring 43 which substantially encompasses a protruding tip portion 45 of activator 37 to maintain a continuous biasing force against the activator in the direction toward article 13. One end of the spring 43 rest against the bottom wall 47 of casing 31. When the activator 37 is released from the first position shown in FIG. 3, it moves upwardly in direction "a" (FIG. 4) so that each of the described engagement members 39 passes through a respective opening 49 (FIG. 1) within seating means 29. Each member thereafter passes through the base 51 of article 13 and engages a respective striker spring 15. As shown in the drawings, the upward movement (direction "a") of activator 37 is linear.

Retention of activator 37 in the described first position is achieved by retaining means 53 which preferably comprises a movable arm 55 pivotally oriented on casing 31 in the manner shown. A slot 56 is provided within casing 31 to accommodate arm 55. A pin 57 is inserted through the outer wall of casing 51 and through one end 59 of arm 55. An opposing end 61 includes a protruding tab member 63 which extends within chamber 33 to engage a surface 65 of actuator 37 when arm 55 is in turn engaged by an external surface 67, e.g. door or window. Removal of surface 67 (in direction "b" shown in FIG. 4) permits arm 55 to pivot outwardly and effect release of the activator.

To prolong the resulting signal from article 13 and also to reduce the initial force necessary to activate said article, actuator 37 can be provided with engagement members 39' of different lengths. This embodiment is shown in FIG. 2 and differs from the embodiment of FIGS. 1, 3, and 4 wherein the engagement members 39 are similar in length. It may also be desirable to provide members 39' with angular ends surfaces 69.

Actuation means 10 further comprises means 71 for securing means 10 to an external surface (not shown), e.g. door or window casing. Securing means 71 preferably comprises an elongated rod 37 which may be bent as shown to facilitate positioning of the invention on said external surface. One end 75 of rod 73 is affixed to casing 31 while an opposing end 77 includes a retention means 79 thereon. Means 71 may comprise a suction cup 81 as shown in FIG. 1 or other form of securement (e.g. wood screw) thereon. End 75 may also include a substantially flat end surface on which is positioned an adhesive material which may serve to retain means 10.

In FIG. 5, an activation means 10' is shown as including a heat sensing means 83 which is operatively joined to a retaining arm 55'. That is, one end 85 of means 83 abuts the lower end 59' of arm 55' while an opposing end 87 abuts a projecting tab 89 of casing 31'. The remaining components of activation means 10 are preferably the same as those shown in FIG. 1. Heat sensing means 83 is preferably a cartridge type metallic heat sensitive fuse comprised of a low temperature melting alloy. This alloy is sold under the name Ostalloy 117 and available from the Arconium Corp. of America, 400 Harris Avenue, Providence, R.I., 02909. Fuse 83 is preferably designed to melt at 117° F. From the foregoing description, it is understood that means 10' provides the highly desirable function of being able to detect high temperatures and thereafter activate a suitable warning component in response to said detection. Means 10' is thus particularly suited for use as a fire detecting activator. It should be further understood however that means 10' may also be capable of detecting the movement of an adjoining surface similarly to means 10 in FIG. 1. This may be accomplished by attaching one end of a chain or similar member of fuse 83 and the other end to the surface being detected. Movement of this surface will therefor result in removal of fuse 83 and the subsequent upward movement of activator 37.

In FIG. 6, an activation means 10" is shown as including a delay means 91 for delaying movement of activator 37 within casing 31 after the actuator has been released by arm 55". Means 91 preferably comprises a restrictive member 93, e.g. an annular ring, located about activator 37 to respectively engage an internal wall 95 of casing 31" during upward movement of the activator. An adjustable relief valve 97 is used to control the rate of air entering chamber 33 during the upward movement of activator 37. The pressure within chamber 33 prior to actuation of means 10" is preferably at atmospheric. Accordingly, the rate of air entering chamber 33 through valve 97 directly affects the rate of upward movement of the activator. One reason for employing a delay feature is to provide a sufficient time period between actuation of means 10" and the subsequent activation of article 13 to permit de-activation of means 10" by someone familiar with its operation. Such a feature would substantially prevent accidental firing of article 13 by the occupants of the premises utilizing the detector.

In FIGS. 7 and 8 there is shown an alternate embodiment of a retaining means for use in the present invention. Retaining means 53' is designed to permit bidirectional ("c" or "d") actuation of the invention such as by a swinging window or door. Means 53' comprises a helical spring 99 having first and second extending segments 100 and 101. First segment 100 is substantially longer than segment 101 and is adapted for being engaged by the aforementioned swinging window or door. Spring 99 extends within chamber 33 of casing 31''' through an aperture 103 provided within the casing. As more clearly shown in FIG. 8, the first segment 100 rests on an upstanding tab 105 provided on activator 37' between two of the engagement members 39. Accordingly, segment 101 rests within a channel 107 adjoining tab 105. The helical portion 109 of spring 99 is thus positioned within the open portion of activator 37' as defined by members 39. Tangential actuation of segment 100 (which extends from casing 31''') causes this segment to move into alignment with another channel 107' provided within activator 37' on the opposing side of tab 105. This movement also results in disengagement of the upper surface 110 of tab 105 by segment 100. The end result is that activator 37' is released and permitted to move upwardly (direction "e") to the described second position. It is understood from the foregoing description that activator 37' can also be released by movement of segment 100 in direction "d" as a result of the segment becoming aligned with channel 107. It is also seen that the upward displacement of activator 37' is limited to the depth of the respective channels 107 and 107'.

Thus there has been shown and described an activation means for activating a flashlamp article containing therein at least one and preferably several percussively ignitable flashlamps. It is also within the scope of the present invention to activate flashlamp units other than those employing prestressed striker springs. For example, the casing of the invention could include therein a suitable power source, e.g. battery, which would supply electrical current to an electrically-activated flashlamp. The function of the activator member of the invention would be to close a corresponding pair of contacts and complete the circuit necessary for said current flow. Additionally, the moving activator could also serve to impact a piezoelectric crystal or similar element located within the invention's casing to in turn provide a high voltage charge to a corresponding electrically-activated flashlamp within the respective flashlamp article. The preferred material for the invention's casings, activators, retaining arms, seating means 29, and elongated arm 73 is medium impact polystyrene. Springs 43 and 99 are 0.030 inch dia. music wire, restrictive member 93 is neoprene, and cup 81 is preferably plasticized polyvinyl chloride. In the embodiment illustrated in FIG. 5, all of the components are preferably aluminum with the exception of fuse 83 and spring 43.

While there have been shown and described what are at present considered the preferred embodiments of the invention, it will be obvious to those skilled in the art that various changes and modifications may be made therein without departing from the scope of the invention as defined by the appended claims.

What is claimed is:

1. Activation means for activating a plurality of flashlamp units located within a flashlamp article wherein each of said units comprises a percussively-ignitable flashlamp and prestressed striker spring associated therewith, said activation means comprising:
   a casing defining a chamber therein;
   seating means located at one end of said casing for having said flashlamp article positioned thereon;
   an activator member movably oriented within said chamber of said casing to occupy first and second positions therein, said activator member including as a portion thereof a plurality of upstanding engagement members, said engagement members engaging said prestressed striker springs to effect release thereof and cause firing of said flashlamp units when said flashlamp article is positioned on said seating means and said activator member occupies said second position, the direction of movement of said activator member being linear;
   means operatively connected to said activator member within said chamber for effecting movement of said activator member from said first position to said second position;
   means for retaining said activator member in said first position and effect release thereof in response to actuation by means external of said activation means; and
   means for securing said activation means to an external surface.

2. The activation means according to claim 1 wherein said seating means includes at least one opening therein, said engagement member passing through said opening prior to engaging said striker spring.

3. The activation means according to claim 1 wherein the number of said engagement members is four.

4. The activation means according to claim 3 wherein said engagement members are similar in length.

5. The activation means according to claim 3 wherein said engagement members are different in length.

6. The activation means according to claim 1 wherein said means for effecting movement of said activator comprises a helical spring positioned substantially about said activator, said helical spring biasing said activator from said first position to said second position.

7. The activation means according to claim 1 wherein said retaining means comprises a movable arm member pivotally oriented on said casing.

8. The activation means according to claim 7 wherein said movable arm member includes a protruding tab for extending within said chamber of said casing to engage said activator member.

9. The activation means according to claim 1 further including heat sensing means operatively joined to said retaining means, said retaining means effecting release of said activator member only when said heat sensing means senses a preestablished temperature.

10. The activation means according to claim 9 wherein said heat sensing means comprises a metallic heat sensitive fuse comprised of a low temperature melting alloy.

11. The activation means according to claim 1 further including delay means for delaying movement of said activator member within said casing from said first position to said second position after release of said activator member by said retaining means.

12. The activation means according to claim 11 wherein said delay means comprises a restrictive member located substantially about said activator, said restrictive member engaging an internal wall of said casing during movement of said activator.

13. The activation means according to claim 12 wherein said delay means further includes an adjustable relief valve positioned within a wall of said casing for controlling the amount of air entering said chamber within said casing during movement of said activator.

14. The activation means according to claim 1 wherein said retaining means comprises a helical spring having first and second extending segments in engagement with said activator member and said casing, said first segment extending from said casing and adapted for being activated by said external actuation means.

15. The activation means according to claim 14 wherein said casing includes an aperture therein, said first and second extending segments of said helical spring extending through said aperture to engage said activator member.

16. Activation means for activating a plurality of flashlamp units located within a flashlamp article, said activation means comprising:
   a casing defining a chamber therein;
   seating means located at one end of said casing for having said flashlamp article positioned thereon;
   an activator member movably oriented within said chamber of said casing to occupy first and second positions therein and including a plurality of engagement members of different length thereon, each of said engagement members effecting firing of a respective one of said flashlamp units when said flashlamp article is positioned on said seating means and said activator member occupies said second position;

means operatively connected to said activator member within said chamber for effecting movement of said activator member from said first position to said second position;

means for retaining said activator member in said first position and effect release thereof in response to actuation by means external of said activation means; and means for securing said activation means to an external surface.

17. The activation means according to claim 16 wherein each of said flashlamp units comprises a percussively-ignitable flashlamp and prestressed striker spring associated therewith, said engagement member engaging said striker spring to effect release thereof when said activator occupies said second position.

18. The activation means according to claim 16 wherein the number of said engagement members is four.

19. Activation means for activating at least one flashlamp unit located within a flashlamp article, said activation means comprising:

a casing defining a chamber therein;

seating means located at one end of said casing for having said flashlamp article positioned thereon;

an activator member movably oriented within said chamber of said casing to occupy first and second positions therein and including at least one upstanding engagement member thereon, said activator member effecting firing of said flashlamp unit when said flashlamp article is positioned on said seating means and said activator member occupies said second position;

means operatively connected to said activator member within said chamber for effecting movement of said activator member from said first position to said second position;

means for retaining said activator member in said first position and effect release thereof in response to actuation by means external of said activation means, said retaining means including a movable arm member pivotally oriented on said casing and having a protruding tab for extending within said chamber of said casing to engage said activator member; and means for securing said activation means to an external surface.

20. The activation means according to claim 19 further including heat sensing means operatively joined to said movable arm member, said movable arm member effecting release of said activator member only when said heat sensing means senses a preestablished temperature.

21. The activation means according to claim 20 wherein said heat sensing means comprises a metallic heat sensitive fuse comprised of a low temperature melting alloy.

22. Activation means for activating at least one flashlamp unit located within a flashlamp article, said activation means comprising:

a casing defining a chamber therein;

seating means located at one end of said casing for having said flashlamp article positioned thereon;

an activator member movably oriented within said chamber of said casing to occupy first and second positions therein and including at least one upstanding engagement member thereon, said activator member effecting firing of said flashlamp unit when said flashlamp article is positioned on said seating means and said activator member occupies said second position;

means operatively connected to said activator member within said chamber for effecting movement of said activator member from said first position to said second position;

means for retaining said activator member in said first position and effect release thereof in response to actuation by means external of said activation means;

delay means for delaying movement of said activator member within said casing from said first position to said second position after release of said activator member by said retaining means; and means for securing said activation means to an external surface.

23. The activation means according to claim 22 wherein said delay means comprises a restrictive member located substantially about said activator, said restrictive member engaging an internal wall of said casing during movement of said activator.

24. The activation means according to claim 23 wherein said delay means further includes an adjustable relief valve positioned within a wall of said casing for controlling the amount of air entering said chamber within said casing during the movement of said activator.

25. The activation means according to claim 23 wherein said restrictive member is an annular ring.

* * * * *